United States Patent [19] [11] 4,124,415
Sporenberg et al. [45] Nov. 7, 1978

[54] PROCESS FOR HEATING METAL STRIPS, IN PARTICULAR NON-FERROUS METAL STRIPS

[75] Inventors: Willi Sporenberg, Hemer-Deilinghofen; Reinhold Wagner, Neuss-Uedesheim, both of Germany

[73] Assignees: Sundwiger Eisenhutte Maschinenfabrik Grah & Co.; Aluminium Norf GmbH, both of Neuss, Germany

[21] Appl. No.: 749,662

[22] Filed: Dec. 13, 1976

[30] Foreign Application Priority Data

Dec. 12, 1975 [DE] Fed. Rep. of Germany ....... 2556057

[51] Int. Cl.$^2$ .................................................. C22F 1/04
[52] U.S. Cl. .................................... 148/13; 148/131; 148/150; 148/153; 148/154; 148/156; 219/10.41
[58] Field of Search ................. 148/13, 150, 154, 156, 148/131, 153; 219/10.41, 10.43

[56] References Cited

U.S. PATENT DOCUMENTS 2,887,422  5/1959  Stone et al. .......................... 148/156

Primary Examiner—R. Dean
Attorney, Agent, or Firm—McGlew and Tuttle

[57] ABSTRACT

A process of treating metal strips using a linear electric motor with spaced apart motor elements comprises directing the metal strips into the space between the motor elements and operating the motor to produce a travelling wave and advancing the strip between the motor parts without contact thereof at a velocity greatly reduced with respect to the velocity of the linear electric motor wave so as to produce a slippage between the wave and the strip and to effect the heating of the strip as it is advanced. The apparatus includes a linear electric motor including a first motor unit spaced away from a second motor unit in the form of a linear motor or return bar so as to form a gap therebetween through which the metal strip is advanced. The apparatus includes means for feeding the strip through straightening rolls and cropping shears, S-rollers and coiling and uncoiling reels.

5 Claims, 4 Drawing Figures

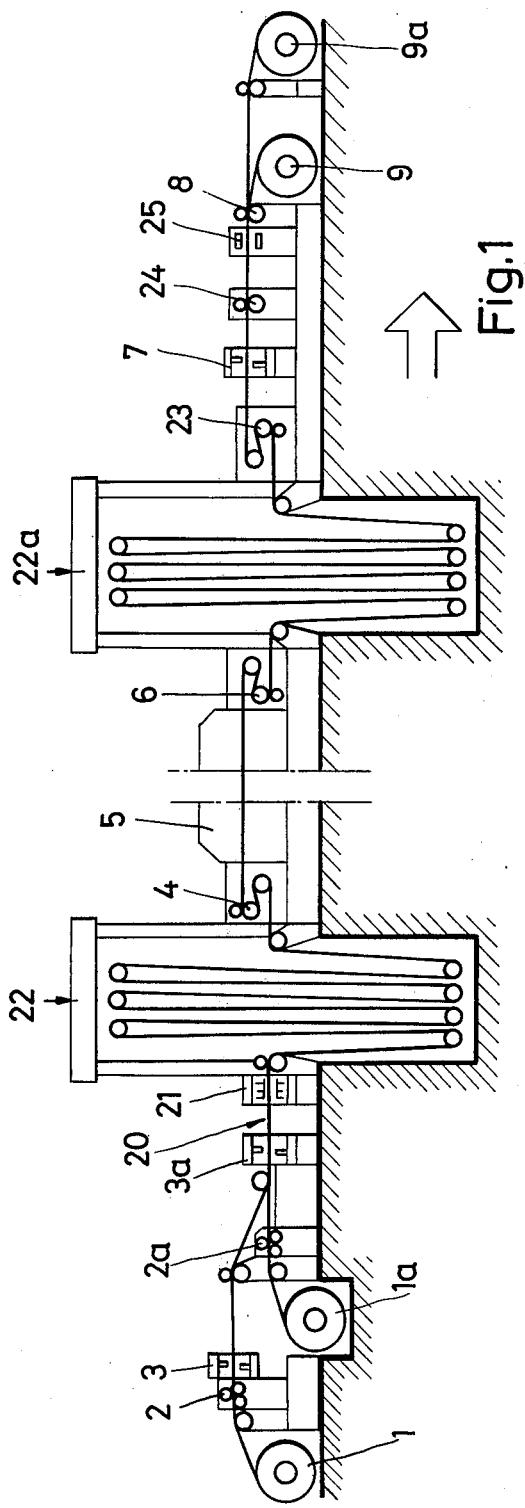
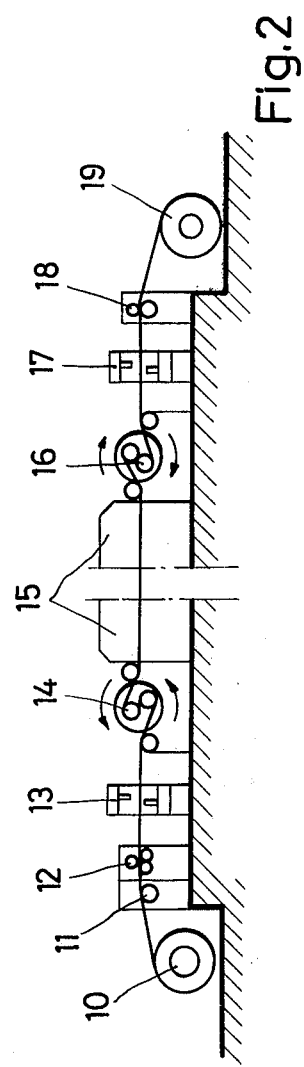

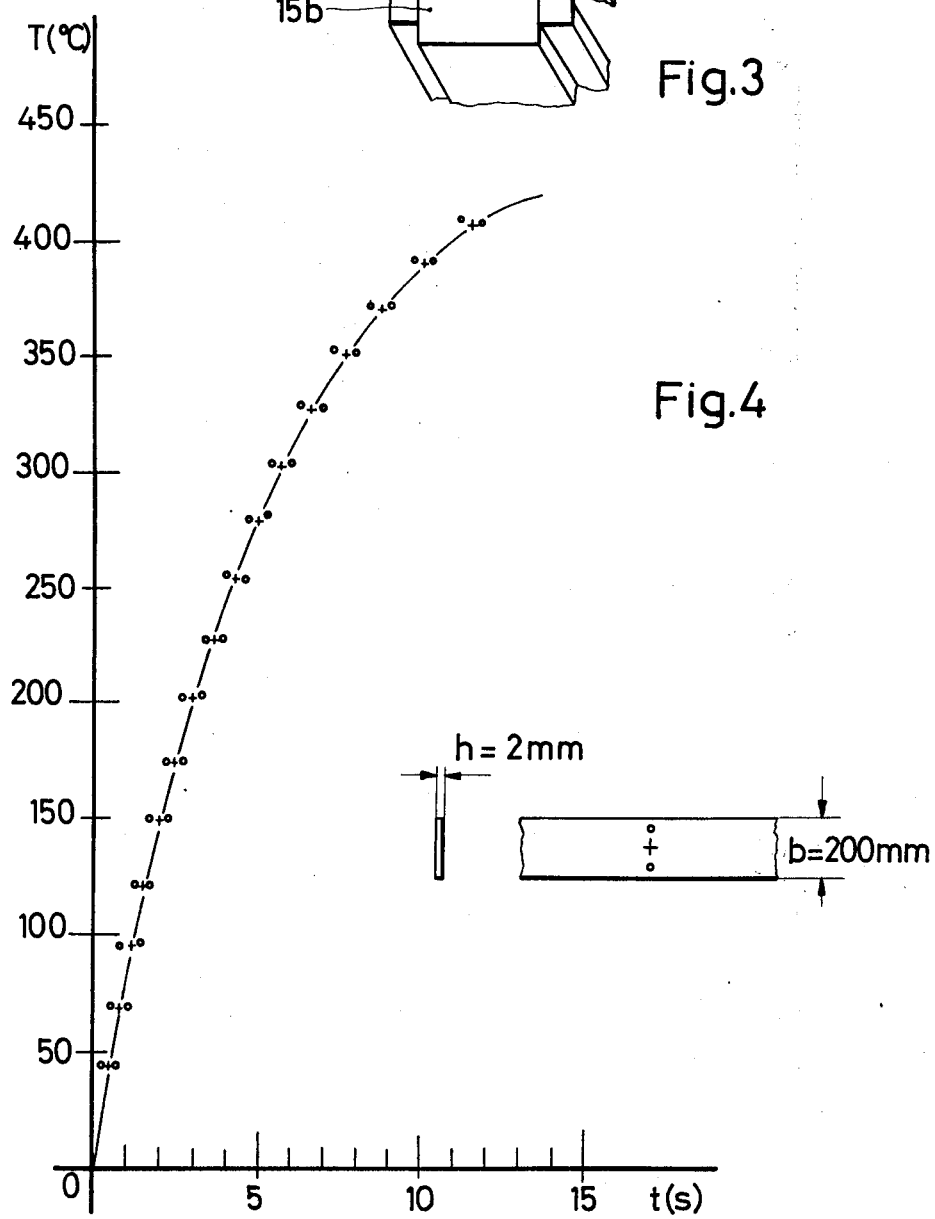

PROCESS FOR HEATING METAL STRIPS, IN PARTICULAR NON-FERROUS METAL STRIPS

BACKGROUND OF THE INVENTION

1. Field of the Invention

This invention relates in general to devices and method for treating metals and in particular to a new and useful process and device for heating non-ferrous metal strips.

2. Description of the Prior Art

It is current practice to heat metal strips continuously while they are transported without contacting them, whereby transport velocities, according to thickness of the strip, of up to 120 m/min. can be reached for the strip. Heating units provided with gas jet nozzles are used to carry out the heating without the strips coming into contact with any transport element. Such heating units, for example, have been successfully employed in the strip and light metal industry. The heat treatment should advantageously uniformly transfer a large amount of heat in a short time to the material to be heated, and also transport the strips without contact.

It is essential for the known embodiment that the strip coming from the coiling reel passes through a looping tower, then through an S-roller unit or aggregate and finally horizontally through the continuous furnace again through an S-roller aggregate onto which joins a second looping tower and the coiling reel. In order to guarantee a continuous operation, two discharge reels and two coiling reels must both be provided in combination with the looping towers and the strip tacking means.

There are also units which are not operated continuously so that these duplicate reels and looping towers can be abandoned. In this case a shutdown period results due to the necessity for tacking or welding of a new metal strip. This shutdown period influences the heat treatment condition of the metal strip in the heat zone, thus providing a greater accumulation of scrap.

If it is taken into consideration that the gas jet furnaces, e.g., in high speed units, for aluminum can be up to 150 m in length, then it is found that the continuous operation has advantages despite the expense of the units, because the accumulation of the scrap is less.

It has also been proposed to heat metal strips and sheets inductively (British Pat. No. 600,673) by passing these products between parallel and spaced groups of induction coils. To the applicants' knowledge such units have not proved themselves in practice for heating metal sheets and strips.

A further proposal is to heat foils electrically directly by contact by means of a circulating roller, by pressing the foils by means of deflection rolls against a section of the circulating roller. The roller itself is heated on the reversed section through using magnetic rotary fields. Unequal heating of the roller is counteracted by different spacings between the rotary field and the roller, so that the foil heated by contact is also uniformly heated (German Offenlegungsschrift No. 2,204,816). This proposal is not suitable for heating without contact.

SUMMARY OF THE INVENTION

The invention provides a process and a device which guarantees uniform heating over the width of the strip at very high transport velocities.

According to the invention the metal strip is conveyed with a slippage sufficient for heating with respect to an electromagnetic travelling wave working in the direction of the strip. In order to obtain the desired slippage, the strip is moved through the travelling wave at a velocity greatly reduced with respect to the velocity of the linear motor. Thereby heating of the strip is achieved. Preferably the velocity of the travelling wave amounts to more than 40 m/s, preferably more than 60 m/s, dependent on throughput and the permitted minimum strip tension, whereas the metal strip moves at a velocity of, for example, 5 to 300 m/min, preferably 10 to 100 m/min. The temperature of the strip is adjusted by the synchronous velocity of the travelling wave and/or the voltage of the travelling wave. In addition, a precise regulation can be achieved by the velocity of the strip, which can be achieved in a manner known per se by means of the drive assemblies of the S-roller and reels through which the strip is passed.

The electromagnetic travelling wave is known to the specialist (see for instance "DER KONSTRUKTEUR" (1974), number 8, page 3). The travelling wave is effected by a linear motor. The linear motor can be interpreted as an asynchronous motor in which the stator is cut open radially and bent to a plane. Doing this the rotating field of the asynchronous motor will become a travelling field. Instead of the cage of the rotor of the asynchronous motor, a conductor bar is used as secondary part. The conductor bar is sometimes called a return bar. The velocity of the heating and the movement velocity are individually controlled in dependence upon the metallic working material, the thickness of the working material and the desired heat-treatment. Thus, thermo-mechanical heat treatment can, for example, also be carried out with the proposed process. This is possible since the strip is on the one hand heated up and at the same time is under tension load. The heat treatment is further especially suitable for cases where a heat treatment temperature of 700° C is not exceeded. Thus, a quenching and tempering treatment, for example, is possible with steel strips.

The proposed process is particularly suited for non-ferrous metal strips, particularly as the heat treatment with such strips is achieved at low temperatures, i.e., approximately 400° to 650° C. The process has particular advantages for the treatment of an aluminum strip. The heat treatment therewith is achieved in the range of from 380° to 580° C, e.g., at about 400° C. In the case of aluminum, the travelling wave and the velocity of the strip are coordinated to one another in such a way that sufficient high speed heating is achieved and also specific tension effect in the annealed area of the strip is maintained below the high temperature strength of the aluminum strip. Therefore, the tension effect with the aluminum strip should be less than 1 kg/mm$^2$ in the annealed area of the strip. It has been found that with aluminum and particularly aluminum-manganese alloys very finely granulated structures and favorable strength values are obtained by the quick and above all uniform heating over the width of the strip (yielding point/yield strength ratio). As is shown above in the preferred example of aluminum, it is recommended with other metal strips not to exceed the permissible load amounts with the tensile effect in the annealed area of the strip.

A preferred device for carrying out the process comprises a high speed heating unit having one linear motor unit and a second unit in the form of a linear motor or return bar, wherein both units are positioned opposite one another and form a gap through which the metal strip may pass. As explained below, this embodiment with a return bar is particularly suited for the low heating temperatures.

In order to be able to adjust to the different strip thicknesses, the spacing between the units can be shifted. The adjustment of this width in the gap influences the heating velocity and the temperature which can be reached. Thus, for example, a gap of 70–120 mm is considered expedient for a metal strip with a width of 0.5–2 mm to pass through. Furthermore, a velocity of the travelling wave of 60–100 m/s is recommended for these dimensions with a strip velocity of 20–60 m/min. As the metal strip is necessarily electromechanically centered in the gap between the respective units, the strip is transported through the gap without contact. The width of the strip to be treated may amount to the width of the armature of the inductor cog of the linear motor at a maximum. It must not exceeed the width of the inductor cog. Cross-sectional shapes, which are adapted to the respective shape of the strip are also possible in addition to the parallel arrangement of both linear motor units mirror-symmetrical to the conceived plane of the metal strip. The linear motor unit can therefore also have a bent cross-sectional shape with a strip which is bent in cross-section. It is essential that the width of the strip is uniformly heated.

The linear motor units are preferably provided with an insulating layer. This layer is on the surfaces of the linear motor units which are arranged to the side of the metal strip, i.e., on the pole faces of the linear motor units. These layers also afford protection for the surface of the strip to be treated, if, for example, contact should be made by mistake. Glass discs treated on one side are suitable for this purpose. Such glass discs guarantee optimum protection as they reflect the radiant heat issuing from the heated metal strip and any damage to the surfaces of the metal strip to be annealed is avoided as they are completely smooth on the metal strip side.

Driving roll units or aggregates or brake roll aggregates and possibly coiling and uncoiling reels are arranged in a manner known per se for transport in front of and behind the linear motor units. An S-roller aggregate, for example, is recommended as driving roll aggregate.

The temperature of the strip can be itself automatically controlled with the assistance of a temperature measuring means which is directly connected to the outlet of the linear motor units. A closed-loop control including measurement of temperature energy of the electromagnetic travelling wave and strip velocity results hereby.

According to a further preferred embodiment the gap for passage of the strip is covered at one or both sides of the units by a channel or passageway. A cooling gas for quicker cooling or a protective gas for protective gas treatment can, for example, be supplied through this channel.

On the other hand this channel is also suitable as a suction channel, if, for example, on heating a metal strip, e.g., a layered metal strip, solvents which will pollute the environment evaporate. These can be sucked off immediately through the channel. Such a construction is recommended, for example, for a high speed heating unit which is used in drying metal strips coated with enamel. There is then the possibility of sucking off the solvent accumulated during drying for recycling for reutilization, causing a much lower amount of pollution to the environment than is possible with known units. As such treatments are carried out at lower temperatures, e.g., at 140°–280° C, the high speed heating unit with return bar is recommended for this purpose. A further advantage in this case is that the bar can more easily be swung away than a linear motor unit.

It results from the above that the subject of the invention can not only be used for heat treatment purposes in the strictly metallurgical sense but also for heating, such as drying, burning in of enamels and similar treatments.

Particular advantages of the invention are that very quick heating, in particular heat treatment, is possible in transport without contact, whereby intermittent operations are possible without larger amounts of scrap accumulating. The costly looping towers and the additional double expense of uncoiling and coiling reels are abandoned. The structure costs are considerably decreased besides the low costs of the unit, which can arise due to the abandonment of the looping towers and the duplicated reels. Moreover, a more sparing treatment of the strip is achieved by the abandonment of the looping towers, Transport of the strip, which can also be of assistance in the threading or inserting the strip into the heating device, can be accomplished by means of the travelling wave. The necessary units only have a fraction of the length which was required in the known gas jet units. Thus, the length of the heating device amounts to only 5 m in a heat treatment at up to 600° C of aluminum at an annealing capacity of about 6 t/h (width of strip 1000 mm). The heating device is ready for use on switching in and therefore a longer starting up time is not necessary in intermittent operation.

The input in temperature is absolutely uniform over the width due to the induction stream within the iron area of the travelling wave motor. No damages to the surfaces arise as the induction forces of the metal strip remain in the center between the two travelling waves, so that there are no points of contact.

Accordingly, it is an object of the invention to provide a process of treatment metal strips using a linear electric motor with spaced apart motor elements which comprises directing the metal strip into the space between the motor elements and operating the motor to produce a travelling wave which progresses therealong and advancing the strip without contact of the strip at a velocity greatly reduced with respect to the velocity of the linear electric motor so as to produce a slippage therebetween and to effect the heating of the strip.

A further object of the invention is to provide a device for treating metal strips which comprises a linear electric motor forming a high speed heating unit with one linear motor unit arranged in opposition to a second unit in the form of a linear motor or return mower so as to define a gap therebetween and means for advancing the metal strip through the gap.

A further object of the invention is to provide a device for treating metal strips which is simple in design, rugged in construction and economical to manufacture.

BRIEF DESCRIPTION OF THE DRAWINGS

In the Drawings:

FIG. 1 is a schematic side elevational representation of a metal treating unit of the prior art;

FIG. 2 is a view similar to FIG. 1 of a metal treating unit constructed in accordance with the invention;

FIG. 3 is a partial perspective view of a device for heat treating metal constructed in accordance with the invention; and FIG. 4 is a curve indicating variations of the temperature of the strip over a period as measured over the width of the strip.

DESCRIPTION OF THE PRIOR ART DEVICE

Referring to FIG. 1 a metal treating device for treating a metal strip 20 comprises means for passing it through a gas jet furnace 5 which is up to 100 m in length. The units includes two supply reels 1 and 1a which feed the respective composite metal strips through respective straightening aggregates or units 2 and 2a respectively. The individual units are fed between shears 3a for cutting into the desired length and through tacking means 21. The sheets then pass through looping towers 22 and 22a which are arranged at respective ends of the gas furnace 5 as well as over similarly located S-shaped roller trains 4 and 6.

After the strips are cropped by the shears 3a the end of the strip can be connected with the leading edge of a new strip by means of the tacking means 21 after a reel has been wound off. In the meantime the strip which is supplied from the looping tower 22 serves to continue the continuous heat treatment in the gas jet furnace 5. In addition to the S-shaped roller aggregates 4 and 6 in the front of and behind the gas jet furnace 5, there are further S-shaped roller aggregate or unit 23 which is connected to the looping tower 22a. Cropping shears 7, a driving trestle 24, brake 25 and a deflection roll 8 are located after the S-roller aggregate 23 which follows the looping tower 22a. The double arrangement of the supply reels 1, 1a and the looping towers 22, 22a and the collecting reels 9, 9a are necessary to render a continuous heat treatment in the very long gas jet furnace 5.

DESCRIPTION OF THE PREFERRED EMBODIMENT

Referring to the drawings in particular the invention embodied therein FIGS. 2 and 3 comprises a metal treating device which does not employ the looping towers 22 and 22a. Such a construction enables a discontinuous working method. The arrangement of FIG. 2 the metal strip 20 is fed from a supply reel 10 over a deflection roll 11, a straightening unit 12, cropping shears 13 and over an S-shaped roller unit through the travelling wave furnace which is generally designated 15. The sheet which is fed through the furnace exits and passed over an S-shaped roller unit 16 and cropping shears 17 and another deflection roller 18 to the collecting reel 19.

In accordance with the invention the travelling wave furnace 15 comprises a linear electric motor assembly as shown in FIG. 3 which is made up of linear motor units 15a and 15a which are spaced apart to define a gap 15c therebetween through which the metal strip 20 is fed. The linear motor unit 15b may for example be a return bar disposed in opposition to a linear motor 15a. A return bar 15b is used in particular with lower heating temperatures of from 100° to 200° C.

The linear motors 15a and 15b are arranged with their pole surfaces near asymmetrical to the plane of the strip 20 in the gap 15c. The metal strip 20 itself may extend so that it is as wide as the armature of the inductor cog of the linear motor units 15a and/or 15b at a maximum. The surfaces of the linear motor units 15a and 15b are advantageously provided with a protective layer 50 to protect the inductor. The linear motor units are approximately 3 to 5 m in length. A path for maintaining the temperature for example to carry out quenching and tempering treatment can extend alongside each unit for example in a cooling channel or heating channel 52 or 54.

The construction of the travelling wave furnace 15 is such that it would be possible to thread the strip 20 through the gap 15c by the operation of the travelling wave furnace itself. In addition the S-shaped roller unit 14 makes it possible to transport the strip up to the gap 15c from where the centering within the gap is undertaken by the travelling wave itself.

As shown in FIG. 4 the high speed unit heating unit according to the invention enables the width of the strip to be uniformly and speedily heated. In a test example, an aluminum strip 2 mm in thickness and 200 mm in length was conveyed through a travelling wave at a velocity of approximately 18 m/min. The travelling wave itself moved at about 60 m/sec. The heating temperature was measured and registered at three points over the width of the strip by means of temperature measuring devices. The schematic representation shown in FIG. 4 indicates that the width of the strip was uniformly heated within a very short time. The total time of heating up from room temperature up to 420° amounted to approximately 13 seconds.

While a specific embodiment of the invention has been shown and described in detail to illustrate the application of the principles of the invention, it will be understood that the invention may be embodied otherwise without departing from such principles.

What is claimed is:

1. A process of treating metal strips using a linear electric motor with spaced apart motor elements, comprising directing the metal strip into the space between the motor elements while the motor is operated to produce a traveling wave in the space, and advancing the strip without contact therewith at a velocity greatly reduced with respect to the velocity of the linear electric motor wave so as to produce a slippage between the strip and the wave meant to heat the strip as it is advanced while said traveling wave is moved at a velocity of more than 40 m/sec with respect to the velocity of the metal strip.

2. Process for heating metal strips continuously, in particular non-ferrous metal strips, comprising heating the metal strip continuously without contact, by passing said metal strip at a velocity of from 5 to 300 m/min through an electromagnetic traveling wave working in the direction of the strip with a slippage with respect to the velocity of said traveling wave to effect heating of the strip as it is advanced, and adjusting the temperature of said metal strip by adjusting at least one of the synchronous velocity of the traveling wave and the voltage of the traveling wave.

3. A process according to claim 1, wherein a non-ferrous metal strip is employed and the travelling wave is adjusted to provide a specific tension effect when the annealed area of the strip is below the high temperature strength of the strip.

4. A process according to claim 3, wherein the strip is an aluminum strip.

5. A process according to claim 1, wherein the temperature of the strip is varied by varying either the velocity or voltage of the travelling wave.

* * * * *